United States Patent
Tame et al.

(10) Patent No.: US 8,876,213 B2
(45) Date of Patent: Nov. 4, 2014

(54) FULL MEMORY ARMREST ASSEMBLY

(75) Inventors: Omar D. Tame, West Bloomfield, MI (US); Xiao Jun Wei, Canton, MI (US)

(73) Assignee: Magna Seating, Inc., Aurora, Ontario (CA)

( * ) Notice: Subject to any disclaimer, the term of this patent is extended or adjusted under 35 U.S.C. 154(b) by 0 days.

(21) Appl. No.: 13/991,573

(22) PCT Filed: Dec. 7, 2010

(86) PCT No.: PCT/CA2010/001945
§ 371 (c)(1),
(2), (4) Date: Jun. 4, 2013

(87) PCT Pub. No.: WO2012/075558
PCT Pub. Date: Jun. 14, 2012

(65) Prior Publication Data
US 2013/0278038 A1    Oct. 24, 2013

(51) Int. Cl.
*A47C 7/54* (2006.01)
*B60N 2/46* (2006.01)

(52) U.S. Cl.
CPC .............. *B60N 2/4606* (2013.01); *A47C 7/543* (2013.01); *B60N 2/4633* (2013.01)
USPC .............. 297/411.38; 297/411.3; 297/411.32; 297/411.35

(58) Field of Classification Search
CPC ............ A47C 7/54; A47C 7/543; B60N 2/46; B60N 2/4606; B60N 2/4626; B60N 2/4633
USPC .............. 297/411.3, 411.32, 411.34, 411.35, 297/411.38
See application file for complete search history.

(56) References Cited

U.S. PATENT DOCUMENTS

| | | | |
|---|---|---|---|
| 3,993,350 A | 11/1976 | McFarlane | |
| 4,946,226 A | 8/1990 | Hurn et al. | |
| 5,106,160 A | 4/1992 | Nomura et al. | |
| 5,743,595 A | 4/1998 | Kirdulis | |
| 5,984,416 A | 11/1999 | Waldo et al. | |
| 6,467,847 B2 | 10/2002 | Bidare | |
| 7,857,393 B2 * | 12/2010 | Cebula et al. | 297/411.32 |
| 2008/0150341 A1 | 6/2008 | Salewski | |
| 2009/0026826 A1 | 1/2009 | Cebula et al. | |
| 2010/0308636 A1 | 12/2010 | Cebula et al. | |

* cited by examiner

*Primary Examiner* — Philip Gabler
(74) *Attorney, Agent, or Firm* — Miller Canfield

(57) ABSTRACT

An armrest is pivotally coupled to a seat back for movement between a stowed position and a use position. The armrest comprises a support frame and a cam. A memory mechanism is coupled to the support frame for actuation between an unlocked condition providing selective adjustment of the armrest in the use position and a locked condition for retaining memory of the use position upon pivotal movement of the armrest between the stowed position and use position. The memory mechanism includes an elongated memory bar fixedly secured to the support frame, a guide member slidably coupled to the memory bar, and a wedge plate slidably and pivotally coupled to the memory bar for movement between a slide position to allow sliding movement of the wedge plate along the memory bar and a wedge position for lockingly wedging the memory bar between the wedge plate and the guide member.

10 Claims, 6 Drawing Sheets

US 8,876,213 B2

FULL MEMORY ARMREST ASSEMBLY

BACKGROUND OF THE INVENTION

1. Field of the Invention

The present invention relates to an armrest assembly and, more particularly, to an armrest assembly which maintains full memory of its previously adjusted use position.

2. Description of Related Art

Automotive vehicles commonly include a seat assembly having a seat cushion for supporting an occupant within the vehicle and a seat back pivotally coupled to the seat cushion. The seat assembly typically includes at least one armrest pivotally coupled to the seat back for movement between a stowed position generally parallel to the seat back and a use position generally perpendicular to the seat back for supporting the occupant's arm. Often, the armrest is adjustable by the occupant in the use position to different angular positions as desired for occupant comfort.

It remains desirable to provide an automatic full memory feature to retain the previously adjusted use position when the armrest is returned to the stowed position.

SUMMARY OF THE INVENTION

An armrest assembly is adapted to be pivotally coupled to a seat back of a seat assembly for pivotal movement between a stowed position generally parallel with the seat back and a use position extending generally transverse from the seat back. The armrest assembly comprises a support frame adapted to be pivotally coupled to the seat back by a pivot post. A cam is fixedly secured to the support frame by the pivot post and includes a cam lobe defining an upper cam surface. A memory mechanism is operatively coupled to the support frame for actuation between an unlocked condition providing selective adjustment of the armrest assembly in the use position and a locked condition for retaining memory of the use position upon pivotal movement of the armrest assembly between the stowed position and use position. The memory mechanism includes an elongated memory bar fixedly secured to the support frame adjacent the cam lobe, a guide member slidably coupled to the memory bar, and a wedge plate slidably and pivotally coupled to the memory bar for movement between a slide position generally aligned with the guide member to allow sliding movement of the wedge plate and guide member along the memory bar and a wedge position generally inclined relative to the guide member for lockingly wedging the memory bar between the wedge plate and the guide member and defining the locked condition.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
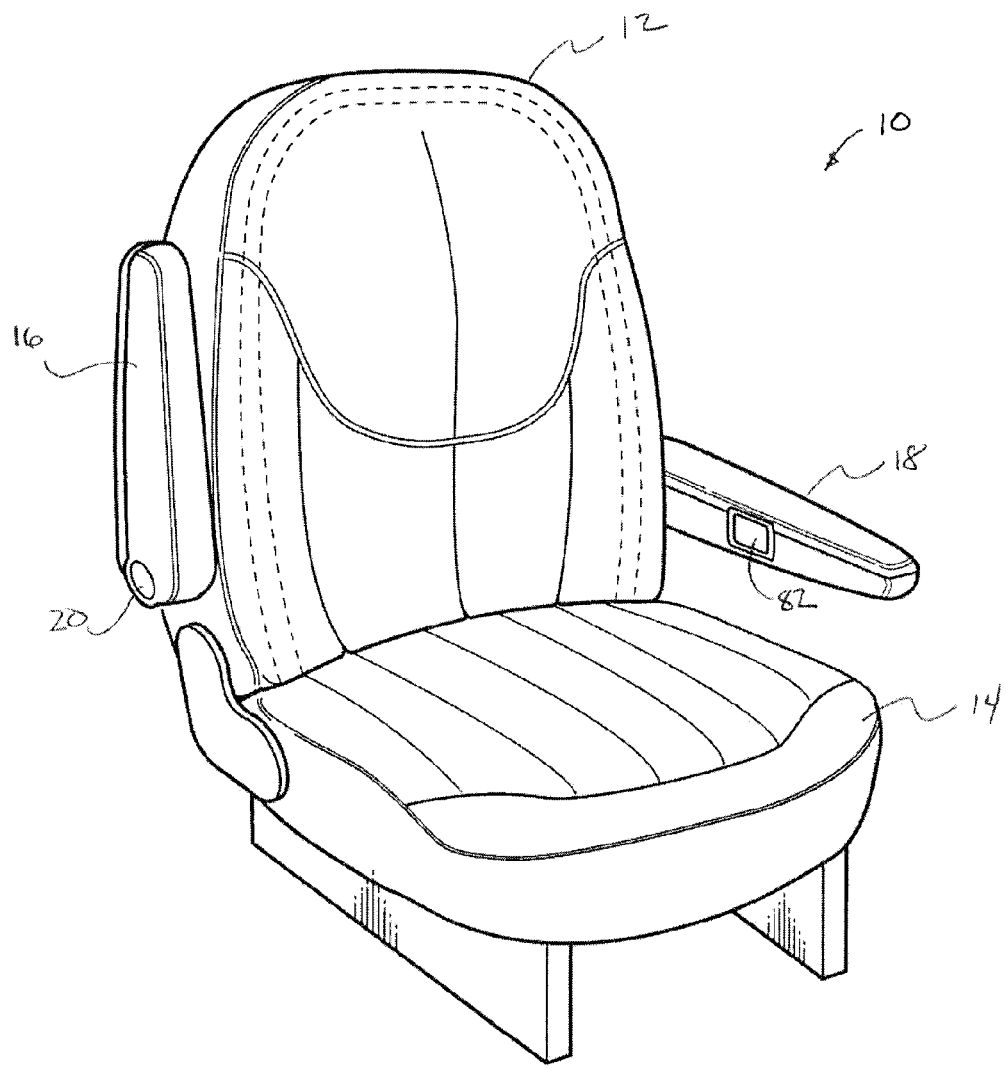
FIG. 1 is a perspective view of a seat assembly having a full memory armrest assembly in a stowed position and use position according to one embodiment of the invention.

Referring to FIG. 1, a seat assembly is generally shown at 10 including a seat back 12 coupled to a seat cushion 14 for supporting an occupant within the seat assembly 10. A pair of full memory armrest assemblies are shown at 16, 18 pivotally coupled to opposing sides of the seat back 12 for pivotal movement between an upright stowed position generally parallel to the seat back 12 and a use position generally perpendicular to the seat back 12 for supporting the arms of the seat occupant. The armrest assembly 16 is shown in the stowed position aligned generally parallel with the seat back 12. The armrest assembly 18 is shown in the use position generally perpendicular to the seat back 12 and generally parallel and spaced above the seat cushion 14. The armrest assembly 16, 18 may be pivotally adjusted between a plurality of angular inclined use positions to provide for selective occupant comfort as will be more specifically described hereinbelow. The armrest assembly 16, 18 is pivotally coupled to a seat back 12 of a vehicle seat assembly by a pivot post 20 for pivotal movement between the stowed position and use position.

Figure 2:
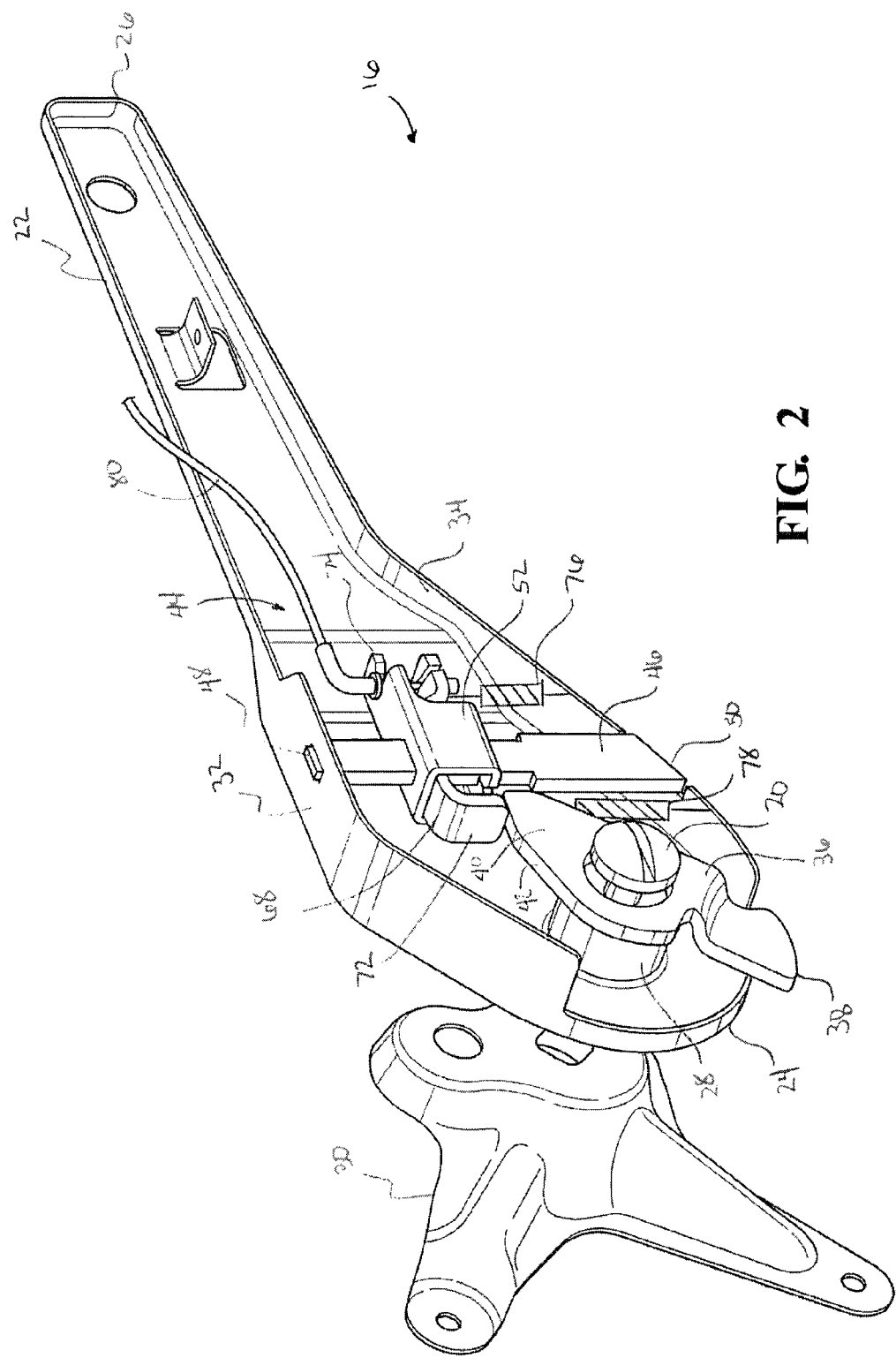
FIG. 2 is a perspective view of the armrest assembly of FIG. 1.
Figure 3:
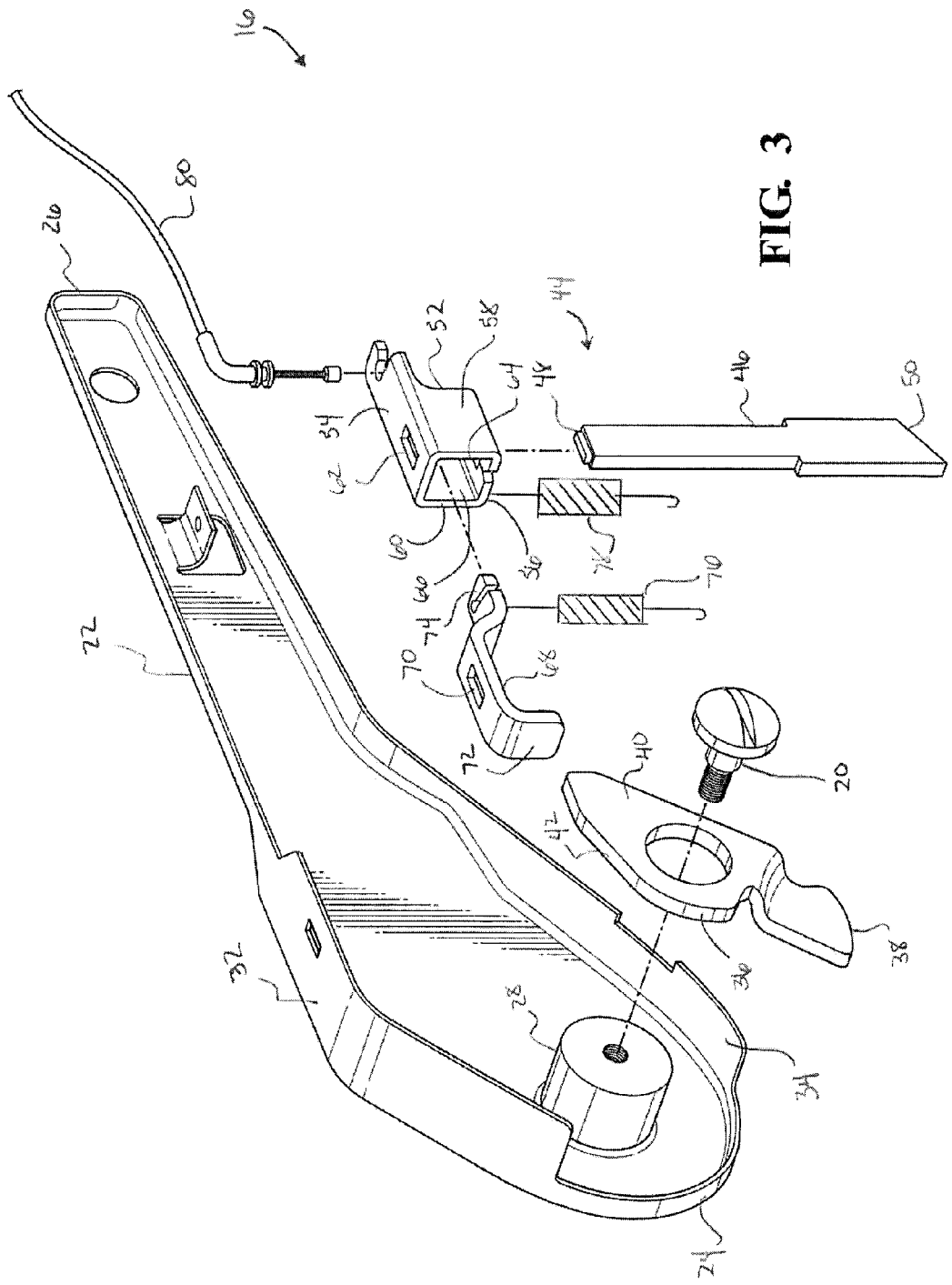
FIG. 3 is an exploded perspective view the armrest assembly of FIG. 2.

Referring to FIGS. 2 and 3, the armrest assembly 16 will be described in more detail. It should be appreciated that the armrest assembly 18 is a mirror image of the armrest assembly 16 and is pivotally mounted to the opposite side of the seat back 12. The armrest assembly 16 includes a support frame 22 having a proximal end 24 pivotally coupled to the seat back 12 by the pivot post 20 and an opposite distal end 26. The support frame 22 includes a pivot hub 28 for receiving the pivot post 20 and mounting the armrest assembly 16 to a support bracket 30 fixedly secured to the seat back 12. It should be appreciated that the armrest assembly 16 may also be pivotally mounted directly to the seat back 12 or seat back frame (not shown) by the pivot post 20 as is commonly known in the art. The support frame 22 further includes an upper flange 32 extending longitudinally between the proximal end 24 and distal end 26 and a lower flange 34 spaced below the upper flange 32 and extending longitudinally between the proximal end 24 and distal end 26. A cam 36 is fixedly secured to pivot hub 28 by the pivot post 20 within the armrest support frame 22. The cam 36 includes a blocking arm 38 extending between the upper and lower flanges 32, 34 for defining a range of maximum pivotal movement of the armrest assembly 16 between the stowed and use positions. The cam 36 further includes a cam lobe 40 extending opposite the blocking arm 38 forming an upper cam surface 42 for defining the adjusted use position.

A memory mechanism 44 is operatively coupled to the support frame 22 for actuation between a locked condition and unlocked condition providing selective adjustment of the incline of the armrest assembly 16 in the use position and for retaining memory of the use position upon pivotal movement of the armrest assembly 16 between the stowed position and use position. The memory mechanism 44 includes elongated memory bar 46 fixedly secured at a first end 48 to the upper flange 32 and an opposite second end 50 to the lower flange 34 adjacent the cam lobe 40. A guide member 52 is slidably coupled to the memory bar 46 for sliding movement between the first and second ends 48, 50. More specifically, the guide member 52 is a generally rectangular hollow tube having an upper wall 54 interconnected to a lower wall 56 by inner and outer walls 58, 60 and defining a tube opening 66. The upper and lower walls 54, 56 each include a slot 62, 64, respectively therein, for receiving the memory bar 46 therethrough. The memory mechanism 44 further includes a generally U-shaped wedge plate 68 extending through the tube opening 66. The wedge plate 68 includes a slot 70 for slidably coupling the wedge plate 68 to the memory bar 46. The wedge plate 68 extends between a first end defining a cam blocker end 72 and an opposite second end defining a lever end 74. The wedge plate 68 is pivotal about the memory bar 46 between a slide position generally parallel and aligned with the upper wall 54 of the guide member 52 and a wedged position generally inclined relative to the upper wall 54 to lockingly wedge the wedge plate 68 along the memory bar 46. A first tension coil spring 76 extends between the lever end 74 and the lower flange 34 for biasing the wedge plate 68 in the wedged position. A second tension coil spring 78 extends between the guide member 52 and lower flange 34 for biasing the guide member 52 and wedge plate 68 towards the cam lobe 40. Finally, a Bowden type cable 80 extends between the lever end 74 and a release handle 82 on the armrest assembly 16, shown in FIG. 1, for actuating the wedge plate 68 from the wedged position to the slide position.

Figure 4:
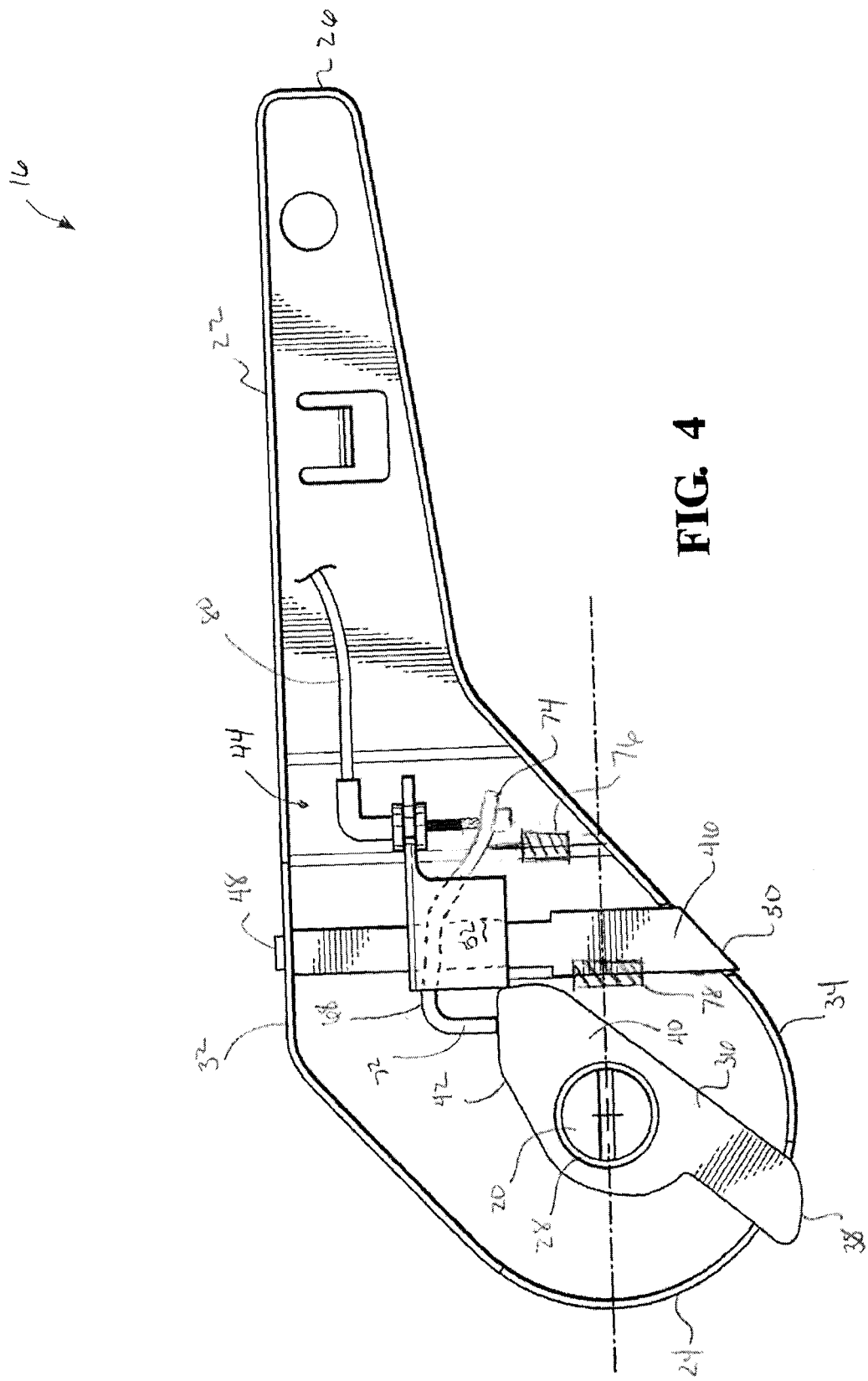
FIG. 4 is a side view of the armrest assembly of FIG. 2 in a locked condition and use position.
Figure 5:
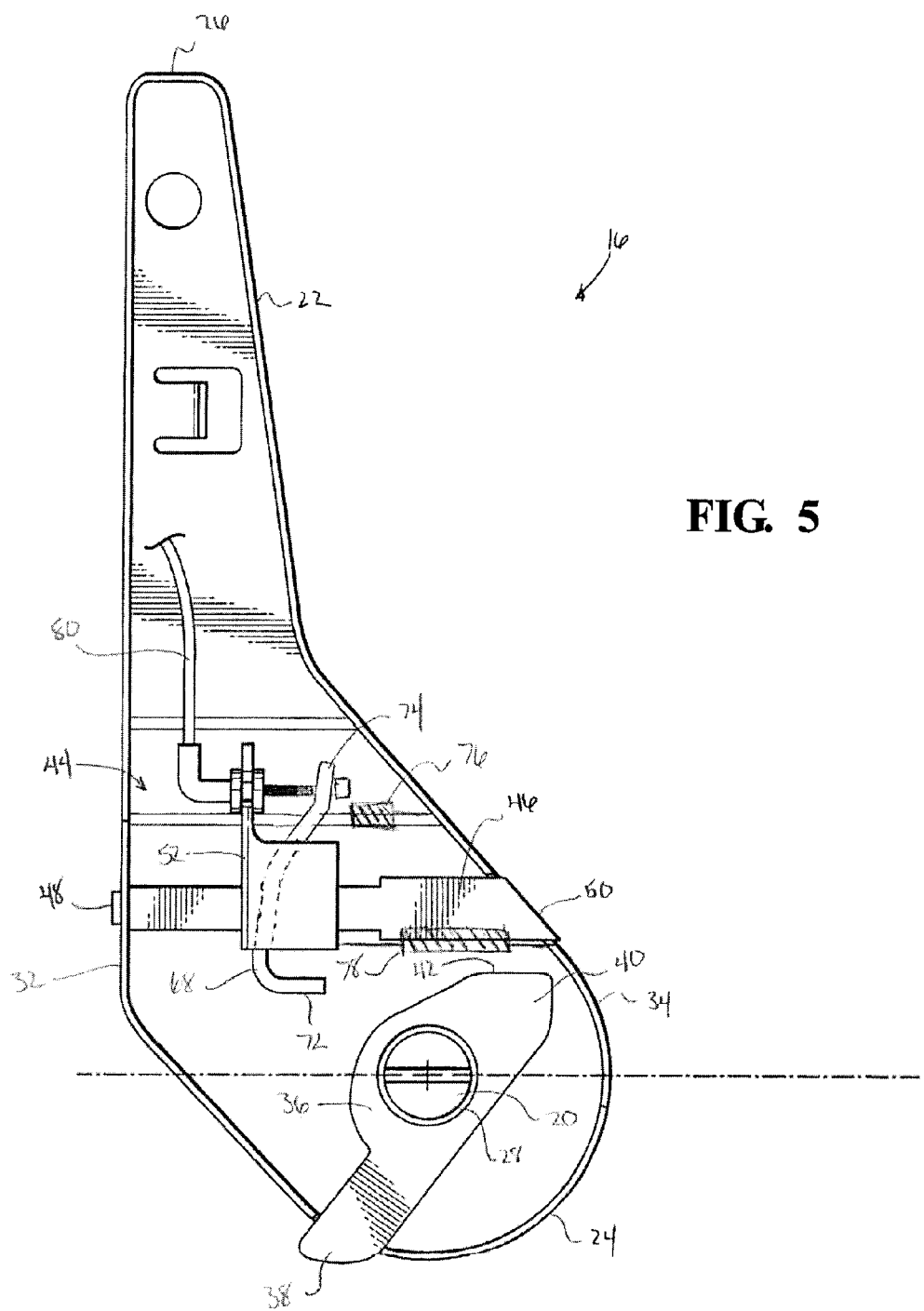
FIG. 5 is a side view of the armrest assembly of FIG. 2 in the stowed position.
Figure 6:
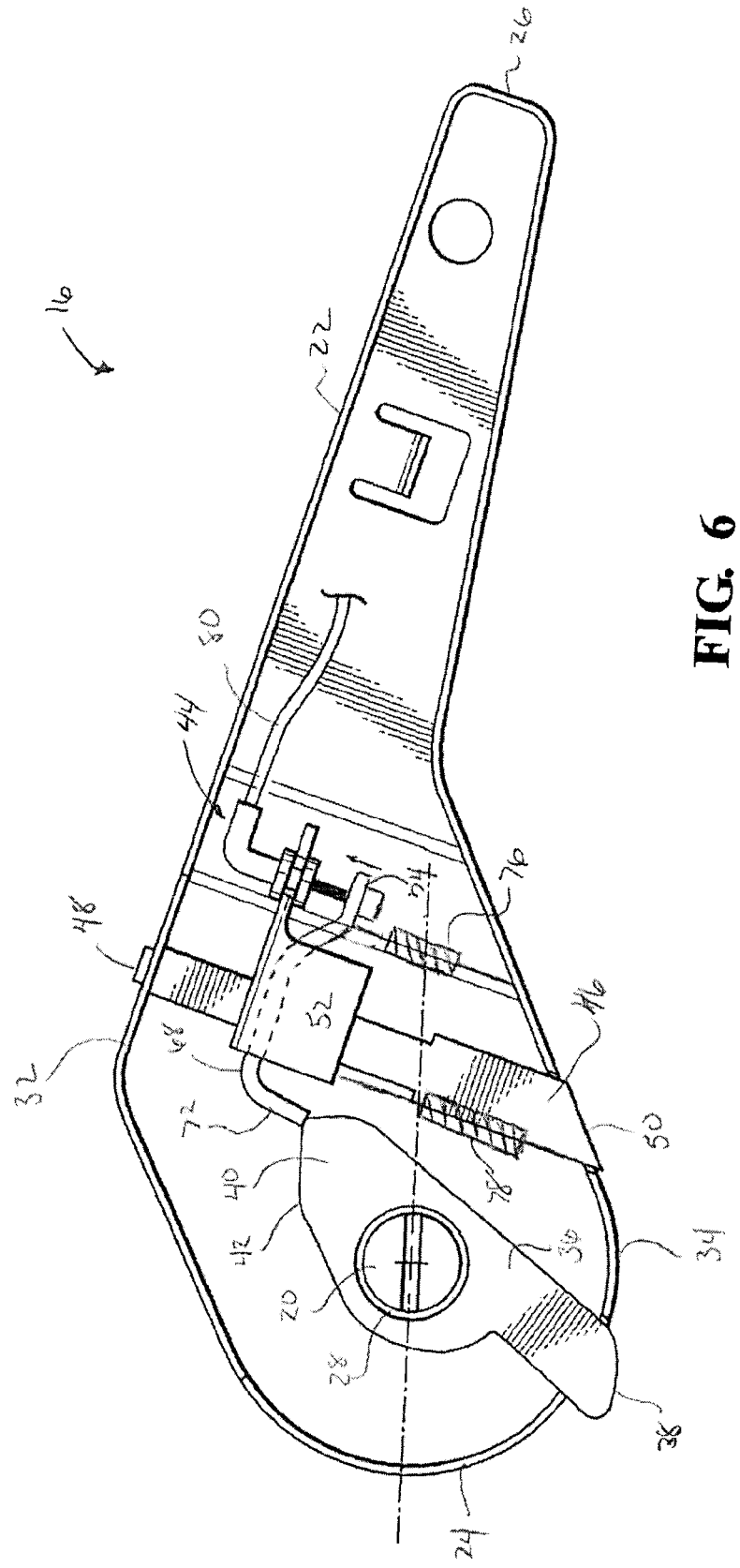
FIG. 6 is a side view of the armrest assembly in an unlocked condition for adjustment in a use position.

In operation, referring to FIGS. 4-6, the armrest assembly 16 is shown in the use position in FIG. 4 with the memory mechanism 44 in the locked condition. In the locked condition, the wedge plate 68 is in the wedged position generally angled or inclined downwardly relative to the guide member 52 to wedge the memory bar 46 in the slot 70 and prevent sliding movement of the wedge plate 68 and guide member 52 along the memory bar 46. The cam blocker end 72 engages the upper cam surface 42 of the cam lobe 40 to prevent downward pivotal movement of the armrest assembly 16 and define the selectively adjusted use position. In the locked condition, the armrest assembly 16 is free to pivot upwardly, or counterclockwise, as shown in FIG. 5 to the upright stowed position. As shown, the cam lobe 40 remains stationary and the memory mechanism 44 rotates around the pivot post 20 and remains in the locked condition maintaining the position of the guide member 52 and wedge plate 68 for return engagement of the cam blocker end 72 with the upper cam surface 42 of the cam lobe 40. Therefore, the memory of the previously adjusted use position is retained by the memory mechanism 44 in the locked condition.

Referring to FIG. 6, to selectively adjust the angle or incline of the armrest assembly 16 in the use position, the occupant actuates the release handle 82 to adjust the memory mechanism 44 from the locked condition to the unlocked condition. The release handle 82 pulls the cable 80 to lift the wedge plate 68 against the bias of the first tension coil spring 76 from the wedged position to the slide position. In the slide position, the slot 70 of the wedge plate 68 is aligned with the slots 62, 64 in the guide member 52 to allow the guide member 52 and wedge plate 68 to slide upward or downward along the memory bar 46. The second tension coil spring 78 biases the guide member 52 and wedge plate 68 towards the cam lobe 40 whereby the cam blocker end 72 maintains contact and is guided along the upper cam surface 42 of the cam lobe as the use position of the armrest assembly 16 is selected. Once the release handle 82 is released, the first tension coil spring 76 returns the wedge plate 68 from the slide position to the wedged position wherein the memory bar 46 is wedged between the slot 70 of the wedge plate 68 and the slots 62, 64 in the guide member 52 and returning the memory mechanism 44 to the locked condition. In the locked condition, the cam blocker end 72 is engaged with the upper cam surface 42 of the cam lobe 40 to support the armrest assembly 16 in the use position and prevent further downward pivotal movement thereof. However, the armrest assembly 16 may be pivoted upwardly from the use position to the stowed position as previously described.

Finally, the blocking arm 38 of the cam 36 engages the upper flange 32 and lower flange 34 of the support frame 22 to define the limits and range of the armrest assembly 16 in the stowed position and use positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. An armrest assembly adapted to be pivotally coupled to a seat back of a seat assembly for pivotal movement between a stowed position generally parallel with the seat back and a use position extending generally transverse from the seat back, said armrest assembly comprising:
a support frame adapted to be pivotally coupled to the seat back by a pivot post;
a cam fixedly secured to said support frame by said pivot post, said cam including a cam lobe defining an upper cam surface; and
a memory mechanism operatively coupled to said support frame for actuation between an unlocked condition providing selective adjustment of said armrest assembly in the use position and a locked condition for retaining memory of the use position upon pivotal movement of said armrest assembly between the stowed position and use position, said memory mechanism including an elongated memory bar fixedly secured to said support frame adjacent said cam lobe, a guide member slidably coupled to said memory bar, and a wedge plate slidably and pivotally coupled to said memory bar for movement between a slide position generally aligned with said guide member to allow sliding movement of said wedge plate and guide member along said memory bar and a wedge position generally inclined relative to said guide member for lockingly wedging said memory bar between said wedge plate and said guide member and defining said locked condition.

2. An armrest assembly as set forth in claim 1 wherein said wedge plate includes a cam blocker end for engaging said upper cam surface on said cam lobe and retain said armrest assembly in the use position and an opposite lever end for actuating said wedge plate between said wedge position and said slide position and allowing selective adjustment of said armrest in the use position.

3. An armrest assembly as set forth in claim 2 wherein said memory mechanism includes a first tension spring coupled between said wedge plate and said support frame for biasing said wedge plate in said wedge position.

4. An armrest assembly as set forth in claim 3 wherein said memory mechanism includes a second tension spring coupled between said guide member and said support frame for biasing said cam blocker end against said upper cam surface of said cam lobe.

5. An armrest assembly as set forth in claim 4 further including a cable operatively coupled between said wedge plate and a release handle for actuating said wedge plate between said wedge position and said slide position.

6. An armrest assembly as set forth in claim 5 wherein said wedge plate includes a slot for slidably and pivotally coupling said wedge plate to said memory bar.

7. An armrest assembly as set forth in claim 6 wherein said guide member includes an upper wall connected to a lower wall by inner and outer walls to define a tube opening, said wedge plate extending through said tube opening along said upper wall.

8. An armrest assembly as set forth in claim 7 wherein said guide member includes an upper slot in said upper wall aligned with a lower slot in said lower wall for slidably coupled said guide plate to said memory bar.

9. An armrest assembly as set forth in claim 8 wherein said slot in said wedge plate is aligned with said upper and lower slots in said guide member with said wedge plate in said slide position to allow sliding movement of said guide member and wedge member along said memory bar in said unlocked condition.

10. An armrest assembly as set forth in claim 9 wherein said wedge plate is inclined relative to said upper wall of said guide member in said wedge position to wedge said memory bar within said slot of said wedge plate and said upper and lower slots of said guide plate in said locked condition.

\* \* \* \* \*